(12) United States Patent
Nakashima et al.

(10) Patent No.: US 8,905,432 B2
(45) Date of Patent: Dec. 9, 2014

(54) CURTAIN AIRBAG

(75) Inventors: Atsushi Nakashima, Yokohama (JP);
Tsukasa Yoshihara, Yokohama (JP);
Hikaru Takahashi, Yokohama (JP);
Akifumi Hanawa, Yokohama (JP)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 14/003,036

(22) PCT Filed: Mar. 2, 2012

(86) PCT No.: PCT/JP2012/055471
§ 371 (c)(1),
(2), (4) Date: Sep. 4, 2013

(87) PCT Pub. No.: WO2012/121175
PCT Pub. Date: Sep. 13, 2012

(65) Prior Publication Data
US 2013/0341894 A1  Dec. 26, 2013

(30) Foreign Application Priority Data

Mar. 4, 2011  (JP) .................................. 2011-048387

(51) Int. Cl.
| | |
|---|---|
| *B60R 21/232* | (2011.01) |
| *B60R 21/26* | (2011.01) |
| *B60R 21/233* | (2006.01) |
| *B60R 21/13* | (2006.01) |
| *B60R 21/231* | (2011.01) |
| *B60R 21/239* | (2006.01) |
| *B60R 21/235* | (2006.01) |

(52) U.S. Cl.
CPC .............. *B60R 21/26* (2013.01); *B60R 21/233* (2013.01); *B60R 21/232* (2013.01); *B60R 21/13* (2013.01); *B60R 21/23138* (2013.01); *B60R 21/239* (2013.01); *B60R 2021/23316* (2013.01); *B60R 2021/23324* (2013.01); *B60R 2021/23576* (2013.01)

USPC ........................... 280/732; 280/729; 280/742

(58) Field of Classification Search
CPC .................. B60R 21/232; B60R 2021/23316; B60R 2021/23324; B60R 2021/26094
USPC ................................ 280/736, 742, 730.2, 729
See application file for complete search history.

(56) References Cited

U.S. PATENT DOCUMENTS 6,213,499 B1 * 4/2001 Khoudari et al. .......... 280/730.2
7,523,958 B2    4/2009 Jang et al.

(Continued)

FOREIGN PATENT DOCUMENTS

| | | |
|---|---|---|
| GB | 2350332 B | 3/2003 |
| JP | 2003320920 A | 11/2003 |

(Continued)

OTHER PUBLICATIONS

International Search Report of PCT/JP2012/055471, Mailed Jun. 12, 2012, 4 pages.

*Primary Examiner* — Ruth Ilan
(74) *Attorney, Agent, or Firm* — Brinks Gilson & Lione (57) ABSTRACT

A curtain airbag capable of preventing a partial decrease in internal pressure to improve ejection prevention performance. The airbag includes: a main chamber, which inflates first; a delay chamber that is inflated with gas from the main chamber; a linear seam portion where front and back base fabrics are joined to partition the main chamber from the delay chamber; a planar seam portion formed at a lower end of the linear seam portion to define a non-inflation region in a range of the front and back base fabrics; and a gas inflow channel provided between the planar seam portion and the lower edge of the airbag to allow gas to flow from the main chamber into the delay chamber. The front and back base fabrics of the gas inflow channel sag upon completion of inflation and deployment to form a wrinkled portion that blocks or narrows the gas inflow channel.

12 Claims, 8 Drawing Sheets

(56) References Cited

U.S. PATENT DOCUMENTS

| | | | |
|---|---|---|---|
| 7,699,342 B2* | 4/2010 | Goto | 280/730.2 |
| 7,922,192 B2* | 4/2011 | Fukuda et al. | 280/730.2 |
| 8,807,595 B2* | 8/2014 | Nakamura et al. | 280/730.2 |
| 2003/0057683 A1* | 3/2003 | Wipasuramonton et al. | 280/730.2 |
| 2006/0061074 A1 | 3/2006 | Aoki et al. | |
| 2006/0202458 A1* | 9/2006 | Tietze | 280/743.1 |
| 2007/0164543 A1* | 7/2007 | Fukuda et al. | 280/729 |
| 2009/0079173 A1 | 3/2009 | Jang et al. | |
| 2009/0236833 A1 | 9/2009 | Tanaka et al. | |
| 2013/0020791 A1* | 1/2013 | Yamamoto et al. | 280/743.1 |

FOREIGN PATENT DOCUMENTS

| | | |
|---|---|---|
| JP | 2005178606 A | 7/2005 |
| JP | 2006088844 A | 4/2006 |
| JP | 2006306377 A | 11/2006 |
| JP | 2008056242 A | 3/2008 |

\* cited by examiner

CURTAIN AIRBAG

BACKGROUND

1. Field of the Invention

The present invention relates to a curtain airbag that is inflated and deployed along a side surface of a vehicle interior for the purpose of protecting occupants during a side crash or a rollover (lateral rollover) of a vehicle.

2. Description of the Related Art

In recent years, high levels of safety performance have been required of vehicles. This trend is shared across countries around the world, where most vehicles are currently standard-equipped with airbags as vehicle safety devices. Companies involved in vehicle development have adopted ongoing safety improvements as a major development guideline. In line with this, new airbags are continually being developed.

Standards for evaluating vehicle safety differ from country to country, and companies approach product development such that products can meet evaluation standards in multiple countries. In the United States, for instance, which has the largest automobile fleet in the world, Federal Motor Vehicle Safety Standards (FMVSS) have been established by the National Highway Traffic Safety Administration (NHTSA). In the Notice of Proposed Rulemaking (NPRM, Docket Number: NHTSA-2009-0183) for FMVSS, which is the basis of FMVSS 226 established by the NHTSA, a requirement is proposed that aims at "reducing the probability of occupant ejection from a vehicle through a side window using an ejection mitigation system in the event of a side impact crash or a rollover (lateral rollover)". The requirement can be met by providing a curtain airbag as an anti-ejection countermeasure that forms an ejection mitigation system.

A curtain airbag is an airbag that is received above a door so as to be inflated and deployed along a side window of a vehicle in the event of an impact. The curtain airbag includes a gas generating device called an inflator. The inflator supplies gas to the inside of the curtain airbag upon detecting an impact with the aid of a sensor. When the curtain airbag receives the gas, a bag-shaped inflation region is inflated to break accommodation tapes or the like with its internal pressure and is deployed into the vehicle interior while pushing a roof trim.

The inflation region of the curtain airbag is partitioned into a plurality of small rooms (chambers) for receiving the occupant. The chambers are set by taking the positions of seats, the flowability of gas, and the like into consideration. In order to improve performance of the curtain airbag in preventing the occupant from being ejected outside the vehicle, it is ideal if the chamber maintains high internal pressure, from completion of inflation and deployment, until the occupant contacts the chamber. For example, in a curtain airbag disclosed in Japanese Patent Application Publication No. 2005-178606, a gasket is formed in the inflator as a sealing member. Moreover, after the inflator is inserted in the curtain airbag, the curtain airbag is joined by bands at the position of the gasket above the base fabric of the curtain airbag. Due to this, it is possible to prevent leakage of gas and to maintain high internal pressure of the curtain airbag.

However, although the technique of Japanese Patent Application Publication No. 2005-178606 can prevent leakage of gas from the entire curtain airbag, the location where the occupant actually contacts the airbag is a portion of the chambers of the curtain airbag. For example, when the occupant contacts one chamber, the gas filled in the chamber moves to another chamber due to the weight of the occupant although the gas does not leak from the curtain airbag. As a result, the internal pressure of the chamber that the occupant contacts decreases, and it is difficult to improve the ejection preventing performance.

SUMMARY

In view of such a problem, an object of the present invention is to provide an airbag capable of preventing a partial decrease in internal pressure to improve ejection prevention performance.

In order to solve the problem, according to a representative aspect of the present invention, there is provided a curtain airbag configured to be received above a side surface of a vehicle interior so as to be inflated and deployed along the side surface, including: a main chamber that is a bag-shaped inflation region which is inflated with gas flowing therein and which is inflated first; a delay chamber that is inflated with gas flowing from the main chamber; a linear seam portion in which front and back base fabrics of the curtain airbag are linearly joined so as to extend from an upper edge of the curtain airbag to a near side of a lower edge to thereby partition the main chamber from the delay chamber; a planar seam portion that is formed at a lower end of the linear seam portion to form a non-inflation region in a predetermined range of the front and back base fabrics; and a gas inflow channel that is provided between the planar seam portion and the lower edge of the curtain airbag so as to allow gas to flow from the main chamber into the delay chamber, wherein the front and back base fabrics of the gas inflow channel sag upon completion of inflation and deployment of the curtain airbag to form a wrinkled portion that blocks or narrows the gas inflow channel.

According to the configuration, after the delay chamber is inflated and deployed, the gas inflow channel is blocked or narrowed by the wrinkled portion, whereby circulation of gas is suppressed. Due to this, leakage of gas from the delay chamber is suppressed. Thus, the delay chamber can receive the occupant while maintaining high internal pressure. The delay chamber may be provided at an optional position, and the delay chamber having the configuration can improve the ejection preventing performance.

The wrinkled portion may be formed in the gas inflow channel when the inflated main chamber and the delay chamber, with the linear seam portion and the planar seam portion as a boundary, approach each other. The main chamber and the delay chamber approach each other in the front-rear direction of the vehicle by an amount corresponding to an increase in the thicknesses in the width direction due to the inflation and deployment. Due to this, it is possible to ideally form the wrinkled portion.

Preferably, the wrinkled portion may be formed between a single point on a lowermost side of the planar seam portion and the lower edge. Since the wrinkled portion can be formed at a single location without spreading the wrinkled portion, the wrinkled portion becomes deeper. Due to this configuration, it is possible to effectively prevent circulation of gas of the gas inflow channel and to maintain higher internal pressure of the delay chamber.

The planar seam portion may have a lower edge that forms an arc. For example, the planar seam portion may be approximately circular, and if the lower edge contacting the gas channel portion forms an arc, since the wrinkled portion is likely to be formed at one lower location described above, it is possible to ideally block the gas inflow channel.

In order to solve the problem, according to another representative aspect of the present invention, there is provided a curtain airbag configured to be received above a side surface of a vehicle interior so as to be inflated and deployed along the side surface, including: a main chamber that is a bag-shaped inflation region which is inflated with gas flowing therein and which is inflated first; a delay chamber that is inflated with gas flowing from the main chamber; a linear seam portion in which front and back base fabrics of the curtain airbag are linearly bonded so as to extend from an upper edge of the curtain airbag to the near side of a lower edge to thereby partition the main chamber from the delay chamber; a planar seam portion that is formed at a lower end of the linear seam portion to form a non-inflation region in a predetermined range of the front and back base fabrics; and a gas inflow channel that is provided between the planar seam portion and the lower edge of the curtain airbag so as to extend along the lower edge of the curtain airbag and to allow gas to flow from the main chamber into the delay chamber, wherein the front and back base fabrics of the gas channel portion are folded to form a wrinkled portion upon completion of inflation and deployment of the curtain airbag.

With this configuration, after the delay chamber is inflated and deployed, the circulation of gas is suppressed by the wrinkled portion. Due to this, leakage of gas from the delay chamber is suppressed, and the delay chamber can receive the occupant while maintaining high internal pressure. Therefore, the delay chamber having the configuration can improve the ejection preventing performance.

In the wrinkled portion, the front and back base fabrics of the gas channel portion may be folded so that the front and back base fabrics are closely contacted each other. According to the wrinkled portion having such a configuration, since the gas channel portion is blocked, it is possible to maintain the internal pressure of the delay chamber more ideally.

The curtain airbag may further include a strap that connects an end of the curtain airbag in a front-rear direction to a pillar, and preferably, the strap may have such a length that the strap does not become tense upon completion of inflation and deployment of the curtain airbag. The strap has an effect of stabilizing the behavior and attitude of the curtain airbag during inflation and deployment. Further, if the strap has such a length, since the strap may not become too tense to pull the delay chamber or the like, it is possible to obtain the effect without interrupting formation of the wrinkled portion.

The strap may have such a length that the strap does not become tense until the curtain airbag receives an occupant to reach a predetermined position outside the vehicle. If the strap has such a length, even when the curtain airbag oscillates upon receiving the occupant, the strap will not pull the curtain airbag and the wrinkled portion may not disappear. Therefore, the delay chamber can receive the occupant while maintaining high internal pressure due to the wrinkled portion.

The strap may be formed at a position above the gas channel portion in a vertical direction of the curtain airbag. If the strap is formed at such a position, tension will not be directly applied from the strap to the gas channel portion. Therefore, the strap can support the curtain airbag and exhibit the effect of stabilizing the deployment behavior the curtain airbag without interrupting formation of the wrinkled portion.

The strap may be formed at a position above a center in a vertical direction of the curtain airbag. If the strap is formed at such a position, it is possible to guarantee reliable formation of the wrinkled portion and to support the curtain airbag.

According to the present invention, it is possible to provide an airbag capable of preventing a partial decrease in internal pressure to improve ejection prevention performance.

DETAILED DESCRIPTION OF THE PREFERRED EMBODIMENTS

Preferred embodiments of the present invention will be explained next in detail with reference to accompanying drawings. Dimensions, materials, other specific numerical values and the like given in the embodiments are only illustrative in character, for the sake of easier understanding of the invention, and, unless particularly stated otherwise, are not meant to limit the present invention in any way. In the description and the drawings, elements having substantially the same function and configuration are denoted by identical reference numerals, and a recurrent explanation thereof will be omitted. Elements that are not directly related to the present invention are omitted in the drawings.

Figure 1A:
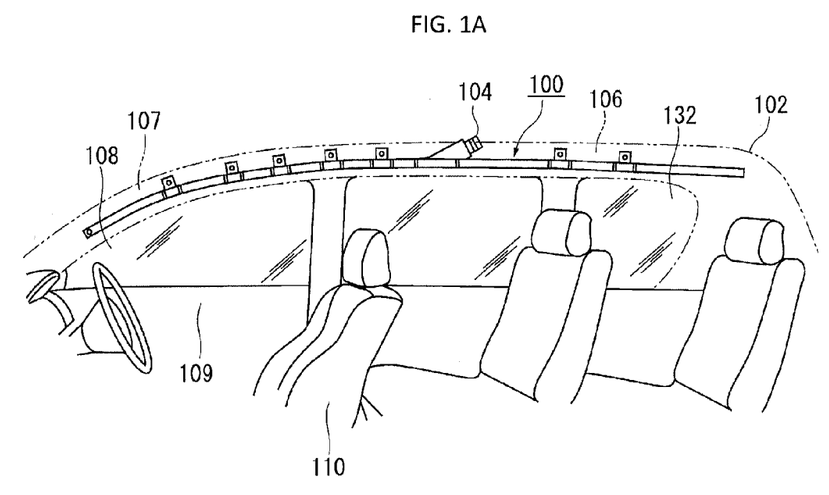
FIGS. 1A and 1B are diagrams illustrating a curtain airbag according to an embodiment of the present invention.
Figure 1B:
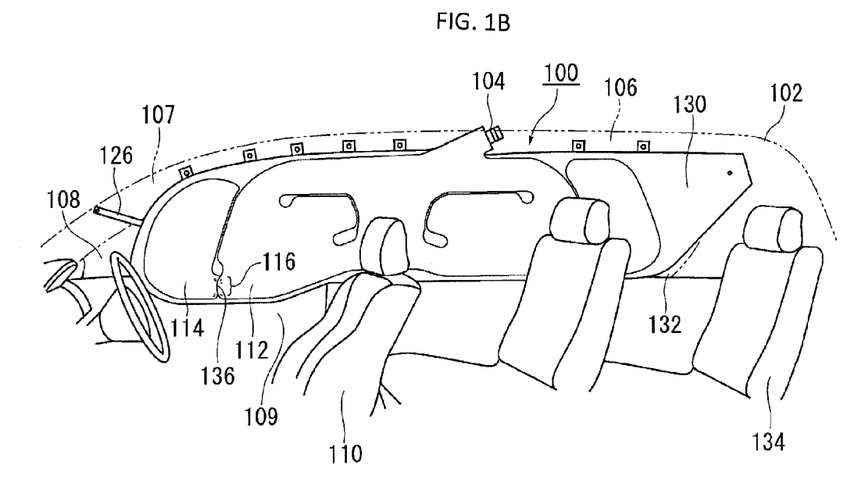

FIGS. 1A and 1B are diagrams illustrating a curtain airbag according to an embodiment of the present invention. FIG. 1A illustrates a curtain airbag (hereinafter referred to as an "airbag 100") in a non-deployed state and FIG. 1B illustrates the airbag 100 in a deployed state. In the following description, although all embodiments are described with reference to a right-side curtain airbag of a vehicle 102 as illustrated in FIGS. 1A and 1B, a left-side curtain airbag has a similar structure that is symmetrical to that of the right-side curtain airbag.

As illustrated in FIG. 1A, the airbag 100 includes an inflator 104 which is a gas generating device. The airbag 100 is inflated with the pressure of gas supplied from the inflator 104 to restrain an occupant. In particular, the airbag 100 can suppress a partial decrease in internal pressure and exhibit high ejection preventing performance.

The airbag 100 is attached to and received in a roof side rail 106 (indicated by a virtual line in the figure) above a side surface of a vehicle interior in a rolled state as shown in FIG. 1A or in a folded state (not illustrated). In general, the roof side rail 106 is covered by a roof trim and is not visible from the vehicle interior.

When a side crash, a rollover (lateral rollover), or the like occurs in the vehicle 102, first, a sensor (not illustrated) included in the vehicle 102 detects an impact and sends an ignition signal to the inflator 104. Then, an explosive in the inflator 104 burns to generate gas which is supplied to the airbag 100. Upon receiving the gas from the inflator 104, as illustrated in FIG. 1B, an inflation region of the airbag 100 is deployed downward along the side surface (a side window 108 or the like) of the vehicle interior to thereby protect the occupant.

Figure 2:
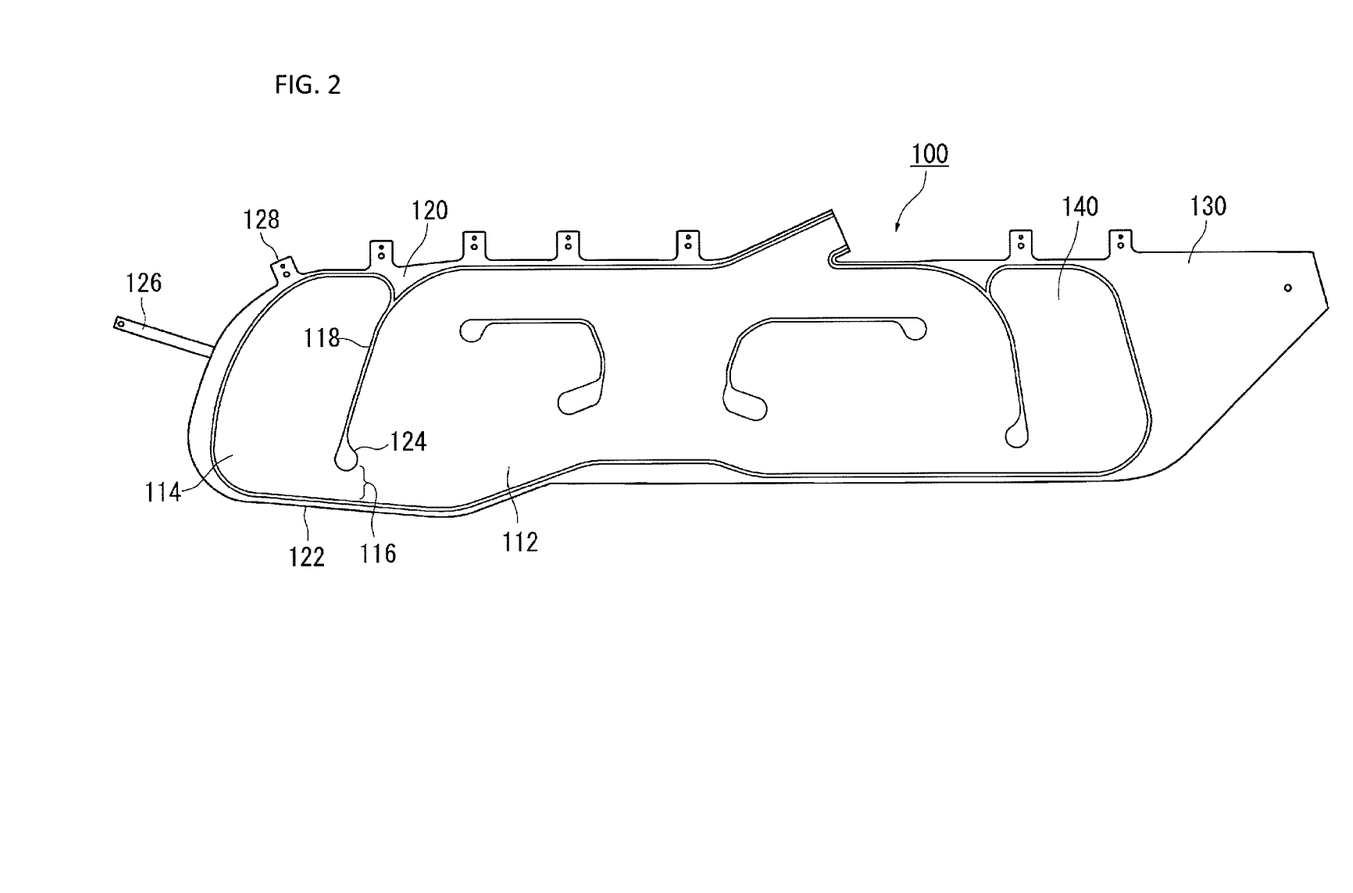
FIG. 2 is a diagram illustrating a deployed state where the curtain airbag of FIG. 1A is not inflated.

FIG. 2 is a diagram illustrating a deployed state where the curtain airbag of FIG. 1A is not inflated. The airbag 100 illustrated in FIG. 2 is formed by weaving using one-piece woven (OPW) in the present embodiment. As another example, the airbag 100 may be formed by sewing two base fabrics that form the surface of the airbag or bonding the two base fabrics. The inflation region that is inflated with the gas flowing therein is formed in a bag shape.

The inflation region of the airbag 100 is partitioned into a plurality of small rooms (chambers). For example, in the present embodiment, a main chamber 112 is disposed next to a front seat 110 (see FIG. 1B). The main chamber 112 is provided for the purpose of receiving an occupant at a normal seating position in the initial stage of a side crash or the like. A delay chamber 114 is disposed in front of the main chamber 112. The delay chamber 114 is disposed in front of a front seat space so as to receive the occupant displaced from the normal seating position in rollover events or the like. The main chamber 112 and the delay chamber 114 are provided so that the respective lower parts overlap a door trim 109 in order to suppress the chambers from moving outside the vehicle when the occupant is received.

Gas flows from the main chamber 112 into the delay chamber 114 through a gas inflow channel 116. Thus, the main chamber 112 is configured to start inflating and deploying first, and subsequently, the delay chamber 114 is inflated and deployed later than the main chamber 112. In this manner, since the inflation and deployment of the delay chamber 114 is completed slightly late, an inflated state is created in synchronization with a rollover that occurs subsequent to a side crash.

The main chamber 112 and the delay chamber 114 are partitioned by a linear seam portion 118 in which the front and back base fabrics are integrally joined (bonded). The linear seam portion 118 is linearly formed to extend from an upper edge 120 of the airbag 100 to the near side of a lower edge 122. A planar seam portion 124 is formed at the lower end of the linear seam portion 118. The planar seam portion 124 is a non-inflation region in which a predetermined range of the front and back base fabrics are integrally joined and which spreads in area more than the linear seam portion 118. In the present embodiment, the planar seam portion 124 spreads in the front-rear direction of the vehicle more than the linear seam portion 118. The planar seam portion 124 has an effect of preventing concentration of tensile stress on the end of the linear seam portion 118 during inflation and deployment and preventing breakage of the base fabrics. The gas inflow channel 116 is formed between the planar seam portion and the lower edge 122.

A strap 126 is provided on the front side of the delay chamber 114. The strap 126 stabilizes the behavior and attitude during inflation and deployment of the airbag 100 by connecting the front end of the airbag 100 to the front pillar 107 (see FIG. 1B). Moreover, a plurality of tabs 128 is formed on the upper edge 120 of the airbag 100. The tab 128 is a portion that serves as a fixing point to the vehicle 102. Further, a wide portion 130 is formed on the vehicle-rear-end side of the airbag 100. The wide portion 130 is a portion that helps to prevent ejection of the occupant of a rearmost seat 134 from a rearmost window 132 (see FIG. 1B). The wide portion 130 is wide fabric-shaped and is configured to restrain the occupant by spreading out approximately planarly without inflating.

Reference is made again to FIG. 1B. As illustrated in FIG. 1B, a wrinkled portion 136 that blocks or narrows the gas inflow channel 116 during completion of inflation and deployment is formed in the airbag 100. Due to this, it is possible to maintain the internal pressure immediately after the completion of inflation and deployment of the delay chamber 114 as long as possible (several tens to hundreds of milliseconds). Hereinafter, the wrinkled portion 136 will be described.

Figure 3A:
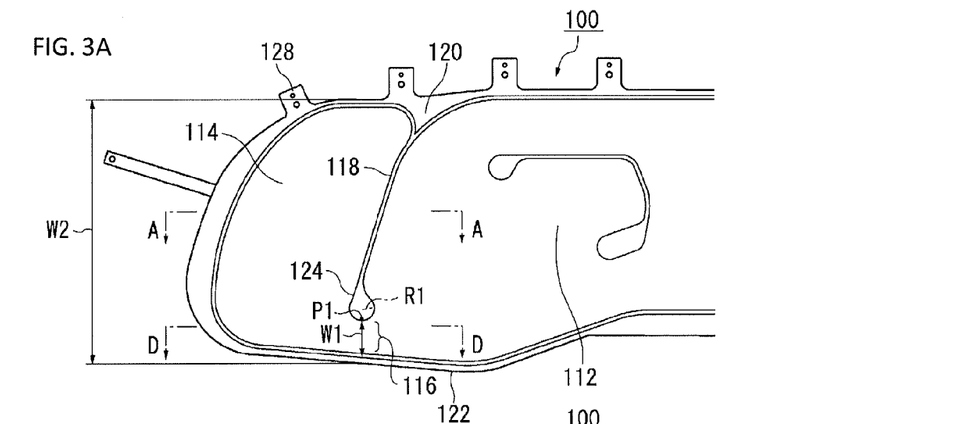
FIGS. 3A to 3C are diagrams illustrating the process in which the curtain airbag of FIG. 2 is inflated and deployed.

FIGS. 3A to 3C are diagrams illustrating the process of inflating and deploying the curtain airbag of FIG. 2. FIG. 3A illustrates the main chamber 112 and the delay chamber 114 in the non-inflated state of FIG. 2. When the inflator 104 (see FIG. 1A) supplies gas from the state illustrated in FIG. 3A, first, the main chamber 112 starts inflating.

Figure 3B:
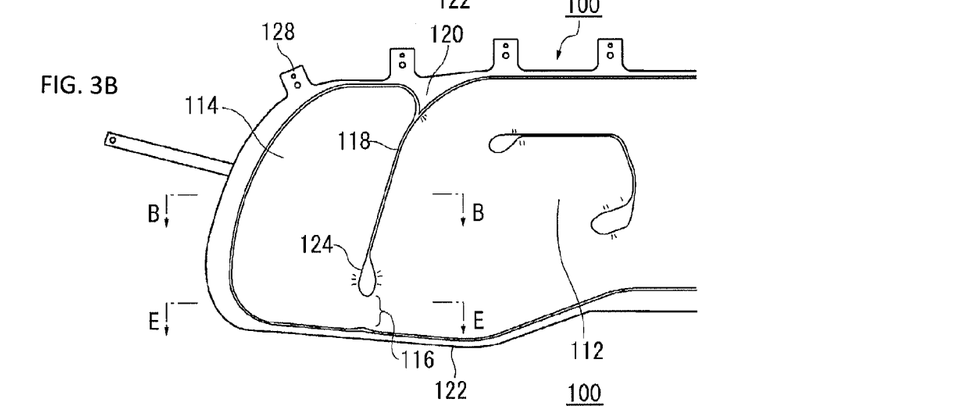

FIG. 3B is a diagram illustrating the curtain airbag in a state where the inflow of gas has progressed further than that of FIG. 3A. As illustrated in FIG. 3B, after the inflation of the main chamber 112 has progressed, gas flows from the main chamber 112 into the delay chamber 114 through the gas inflow channel 116. Here, the main chamber 112 and the delay chamber 114 approach each other in the front-rear direction of the vehicle by an amount corresponding to an increase in the thicknesses in the width direction of the vehicle due to the inflation. In this case, since the curtain airbag is fixed to the vehicle 102 by the tabs 128 and the like, the delay chamber 114 is slightly moved relatively toward the main chamber (toward the center in the front-rear direction of the vehicle).

Figure 3C:
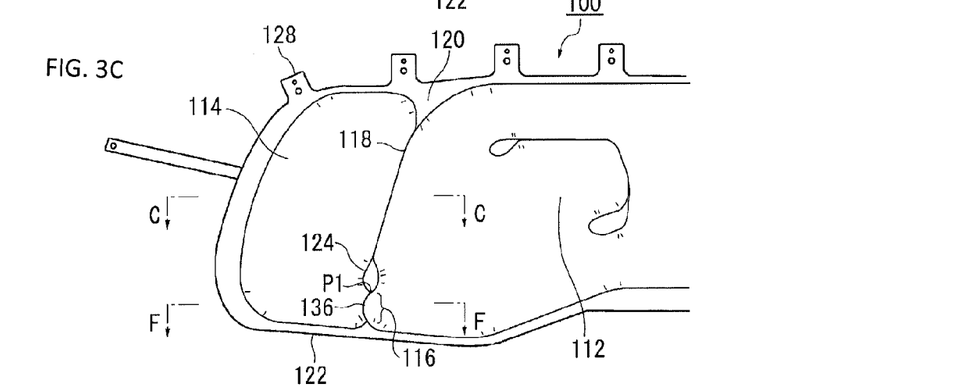

FIG. 3C is a diagram illustrating the curtain airbag in which inflation and deployment is completed. As illustrated in FIG. 3C, due to completion of inflation and deployment, the main chamber 112 and the delay chamber 114 approach further. In this case, sagging occurs in the base fabric of the gas inflow channel 116, and the wrinkled portion 136 is formed. Due to the wrinkled portion 136, leakage of gas from the delay chamber 114 is prevented.

Figure 4A:
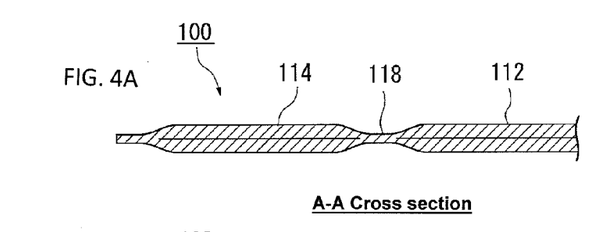
FIGS. 4A to 4F are cross-sectional views at respective locations of FIGS. 3A to 3C.
Figure 4B:
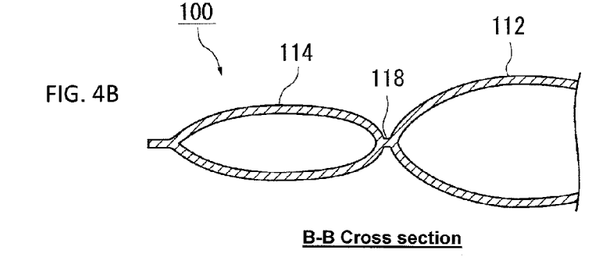

The wrinkled portion 136 will be described in further detail with reference to FIGS. 4A to 4F. FIGS. 4A to 4F are cross-sectional views at the respective locations of FIGS. 3A to 3C. First, FIG. 4A is a cross-sectional view along line A-A of FIG. 3A. When gas is supplied from the state of FIG. 4A, as illustrated in FIG. 4B (a cross-sectional view along line B-B of FIG. 3B), the main chamber 112 is inflated first, and subsequently, the delay chamber 114 starts inflating.

Figure 4C:
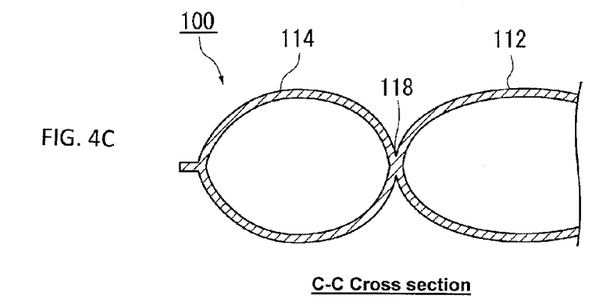

When the inflow of gas progresses, as illustrated in FIG. 4C (a cross-sectional view along line C-C of FIG. 3C), inflation is completed in a state where the internal pressure of the main chamber 112 is approximately the same as that of the delay chamber 114. As illustrated in FIGS. 4A to 4C, the main chamber 112 and the delay chamber 114 approach each other in the front-rear direction of the vehicle by an amount corresponding to an increase in the thicknesses in the width direction of the vehicle due to the inflation. In particular, since the tabs 128 (see FIGS. 4A to 4F) are fixed to the vehicle 102, the delay chamber 114 is slightly moved relatively toward the main chamber (toward the center in the front-rear direction of the vehicle).

Figure 4D:
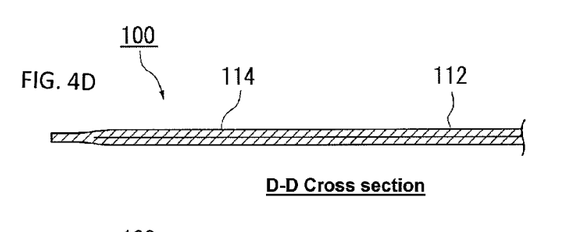
Figure 4E:
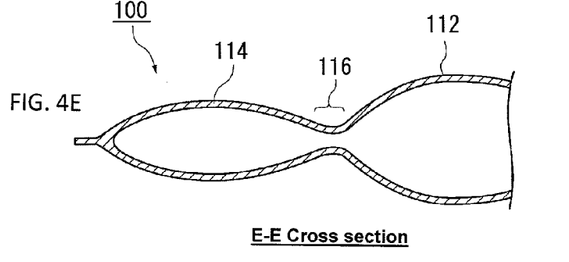
Figure 4F:
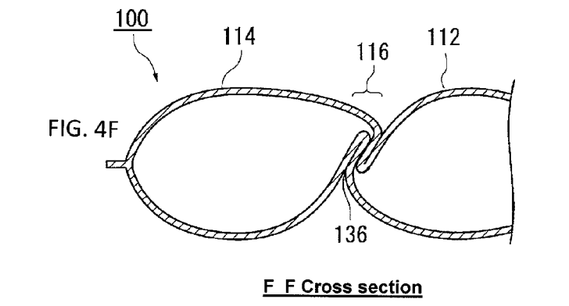

FIGS. 4D to 4F illustrate the process of inflating and deploying a gas channel portion corresponding to FIGS. 4A to 4C. When gas is supplied from the state of FIG. 4D (a cross-sectional view along line D-D of FIG. 3A), as illustrated in FIG. 4E (a cross-sectional view along line E-E of FIG. 3B), the gas flows from the main chamber 112 into the delay chamber 114 through the gas inflow channel 116. Moreover, as illustrated in FIG. 4F (a cross-sectional view along line F-F of FIG. 3C), when inflation of the main chamber 112 and the delay chamber 114 progresses, both chambers approach each other. Due to this, the wrinkled portion 136 is formed in the gas channel portion 116.

Here, as illustrated in FIG. 3B, in the state where the airbag 100 is seen from a side surface, peripheral edges of the respective chambers move toward the respective centers according to the inflation. For example, the delay chamber 114 and the main chamber 112 positioned at both sides of the gas channel portion 116 form a large-diameter chamber that extends approximately from the upper edge 120 of the airbag 100 to the lower edge 122. The lower parts of the delay chamber 114 and the main chamber 112 move upward toward the respective centers (that is, the center in the vertical direction of the airbag 100). On the other hand, the gas channel portion 116 forms a small-diameter chamber that is disposed so as to follow the lower edge 122 of the airbag 100 and that has a non-inflation region such as the linear seam portion 118 or the like disposed thereabove. Thus, even if the airbag 100 is inflated, the amount of displacement toward the upper side of the gas channel portion 116 (that is, toward the center in the vertical direction of the airbag 100) is small. Due to a difference in the amount of displacement from the portions on both sides of the gas channel portion during the inflation, sagging occurs in the base fabric of the gas channel portion 116.

Further, due to a difference in the diameter of the gas channel portion 116 and the delay chamber 114 and main chamber 112, a difference in tension occurs in the base fabric at the respective positions. The tension at the respective positions can be expressed as Equation 1 below.

$$T = P \times r \quad \text{(Equation 1)}$$

T=Tension, P=Internal Pressure (same at respective positions), and r=Radius at respective positions As expressed in Equation 1, the tension applied to the gas channel portion 116 having a small diameter is very smaller than that applied to the delay chamber 114 and the main chamber 112 on both sides. Due to the difference in tension, the gas channel portion 116 is likely to sag. The gas channel portion 116 which is likely to sag in this manner is crushed when the main chamber 112 and the delay chamber 114 on both sides approach each other as illustrated in FIG. 4F, the front and back base fabrics of the gas inflow channel 116 are folded, and the wrinkled portion 136 is formed.

Figure 5:
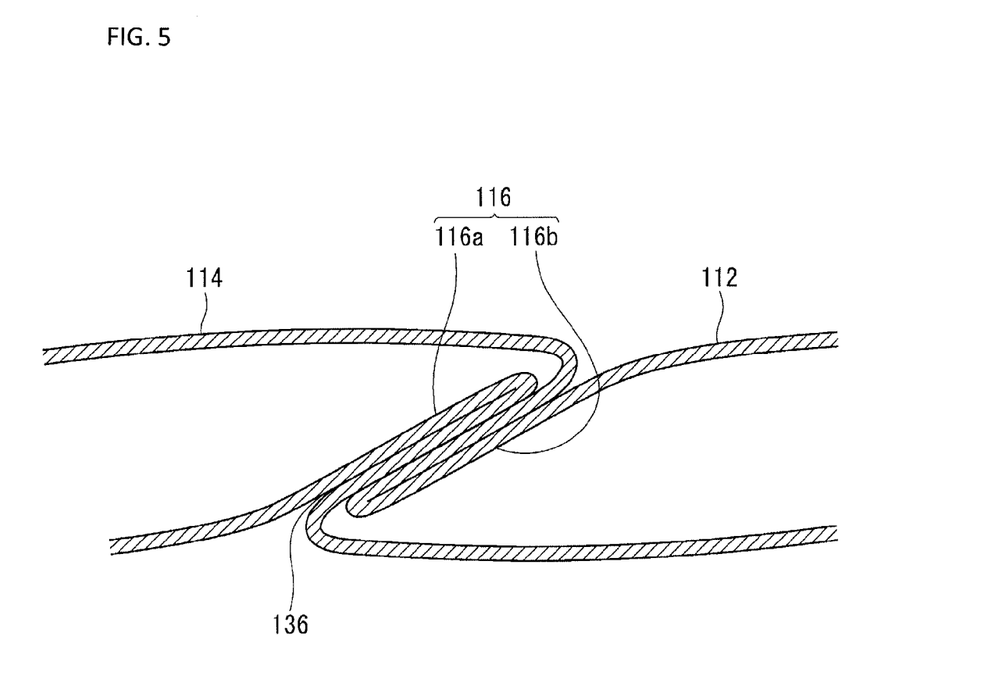
FIG. 5 is a diagram illustrating a portion near a wrinkled portion of FIG. 4F in detail at an enlarged scale.

FIG. 5 is a diagram illustrating a portion near the wrinkled portion 136 of FIG. 4F in detail at an enlarged scale. As described above, when the wrinkled portion 136 is formed, a front base fabric 116a and a back base fabric 116b of the gas channel portion 116 are folded. As a result, the base fabrics 116a and 116b come into close contact, and the gas channel portion 116 is blocked. Due to this configuration, leakage of gas from the delay chamber 114 to the main chamber 112 is suppressed, and the delay chamber 114 can receive the occupant in a state where higher internal pressure is maintained.

In forming of the wrinkled portion 136, the presence of the planar seam portion 124 illustrated in FIG. 3A is important. Since a predetermined range of the planar seam portion 124 is present in the front-rear direction of the vehicle, the tension directed in the front-rear direction of the vehicle and in the upward direction weakens and is not applied to the base fabric of the gas inflow channel 116 disposed below the planar seam portion 124. In addition to this, since the main chamber 112 and the delay chamber 114 approach during completion of inflation and deployment as illustrated in FIG. 3C, the base fabric of the gas inflow channel 116 sags and the wrinkled portion 136 is formed.

In the present embodiment, the planar seam portion 124 (FIG. 3A) has an approximately circular shape having a radius R1=25 mm. The wrinkled portion 136 (see FIG. 3C) is formed between the lower edge 122 and a single point P1 located at the lowermost side of the approximately circular planar seam portion 124. In the present embodiment, as illustrated in FIG. 3A, a gap between the planar seam portion 124 and the lower edge 122 (that is, a vertical width W1 of the gas inflow channel 116) is set to 70 mm (a vertical width W2 of the airbag 100 at the same position is approximately 550 mm). Since a lower edge of the approximately circular planar seam portion 124 forms an arc and the wrinkled portion 136 can be formed at the single point P1 without spreading the wrinkled portion 136, it is possible to form the deeper wrinkled portion 136 as illustrated in FIG. 4F. Due to the wrinkled portion 136, it is possible to effectively prevent circulation of the gas of the gas inflow channel 116 and to maintain higher internal pressure of the delay chamber 114. In this way, the delay chamber 114 can exhibit high ejection preventing performance. The shape of the planar seam portion 124 is not limited to a circular shape but can be appropriately selected from an elliptical shape, a curved shape, and other shapes if the lower edge of the shape forms an arc.

Moreover, an experiment was performed to detect conditions for forming the wrinkled portion 136 described above. According to the experiment, it was found that if the length of the planar seam portion 124 along the gas channel portion 116 (in the present embodiment, corresponding to the diameter of the circle of the planar seam portion 124) is in the range of 150 mm to 5 mm, it is possible to form the wrinkled portion 136 to block the gas channel portion 116. The length is particularly preferably 80 mm or smaller, and best results were obtained in the range of 70 mm to 30 mm. Moreover, it was also found that if the vertical width W1 of the gas channel portion 116 is in the range of 150 mm to 10 mm, the wrinkled portion 136 can be formed. The vertical width is particularly preferably 95 mm or smaller, and best results were obtained in the range of 90 mm to 50 mm.

(Efficacy of Present Embodiment)

Figure 6:
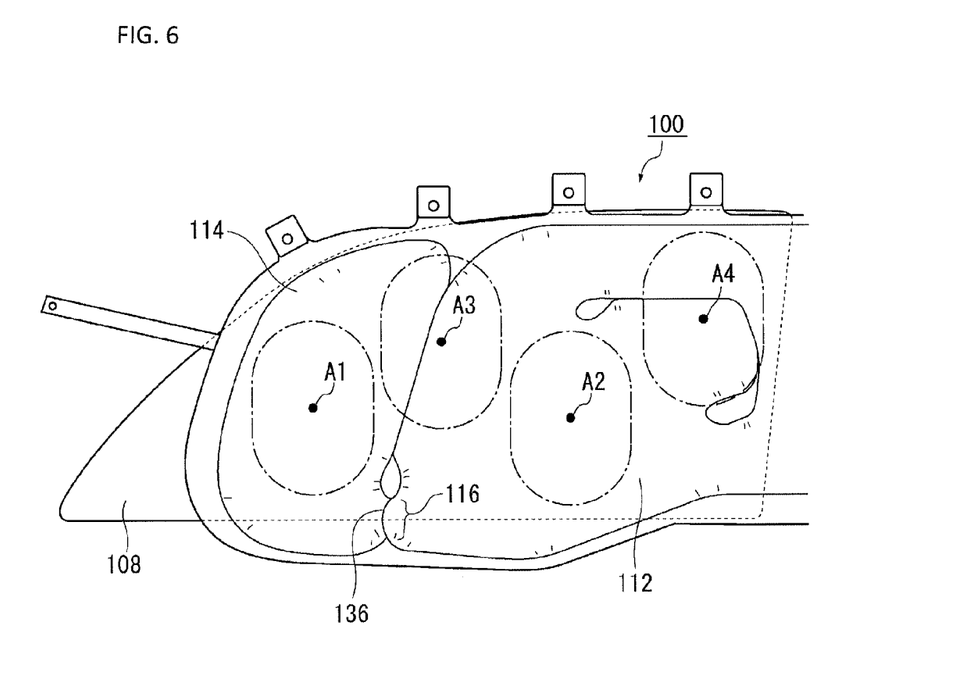
FIG. 6 is a diagram illustrating an ejection preventing performance evaluation test for the curtain airbag according to the present embodiment.

FIG. 6 is a diagram illustrating an ejection preventing performance evaluation test for the curtain airbag according to the present embodiment. An impactor is defined in "V. Proposed Ejection Mitigation Requirements and Test Procedures" of the NPRM (NHTSA-2009-0183). Strike targets of the impactor are defined in Target Locations determined according to "4. Method for Determining Impactor Target Locations", "d. Locations Where the Device Would Impact the Ejection Mitigation Countermeasure To Assess Efficacy", "V. Proposed Ejection Mitigation Requirements and Test Procedures" of the NPRM (NHTSA-2009-0183). Symbols A1 to A4 illustrated in FIG. 6 are impact points (strike targets) of respective targets described in the NPRM (NHTSA-2009-0183). These strike targets are set on the side window 108 on the frontmost side of the vehicle. The delay chamber 114 is designed to cover the frontmost strike target (hereinafter referred to as "impact point A1").

In a side crash test based on the NHTSA-2009-0183, a test device called an impactor (not illustrated) is caused to strike the respective impact points from the vehicle interior side and an amount of displacement of the impactor toward the vehicle exterior is measured. In this case, a reference position for the measurement of the amount of displacement is a vertical plane that is in contact with one point of the impactor on the outermost side of the vehicle in a state where the impactor is in contact with the inner surface of the side window 108.

Figure 7:
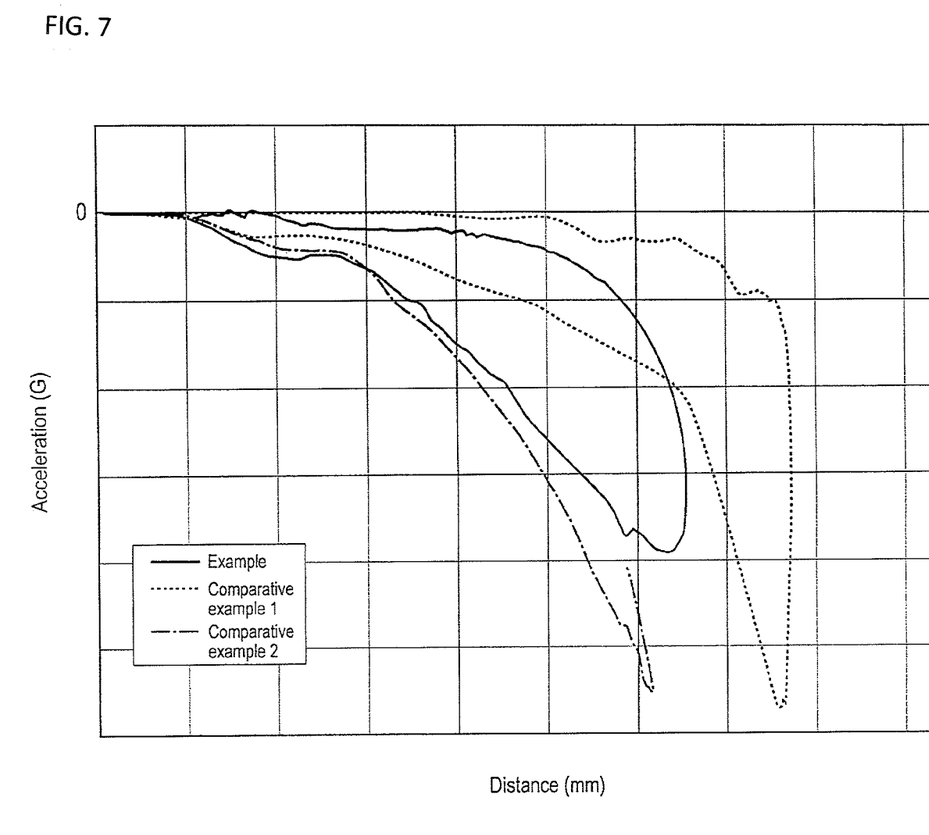
FIG. 7 shows a test result of a side crash test at an impact point A1 of FIG. 6.

FIG. 7 shows a test result of the side crash test at the impact point A1 of FIG. 6. The horizontal axis of FIG. 7 represents a distance from the measurement reference position (depicted by a bold line), and the right side of the bold line is the vehicle exterior side and the left side is the vehicle interior side. The vertical axis represents acceleration of the impactor and represents deceleration from the value 0 at the start of the test.

The test result for the airbag 100 is depicted by a solid line as Example. Moreover, Comparative Example 1 shows a simulation result for a conventional configuration where the wrinkled portion 136 is not formed, and Comparative Example 2 shows a simulation result for a configuration where only a delay chamber is provided without being connected to other chamber.

As illustrated in FIG. 7, the displacement of the impactor for Example is suppressed toward the vehicle interior side as compared to Comparative Example 1. In this case, the distance and acceleration for Example are approximately equal to those of Comparative Example 2. In this manner, in Example, it is possible to exhibit high ejection preventing performance by forming the wrinkled portion 136 described above.

(Modifications)

Figure 8:
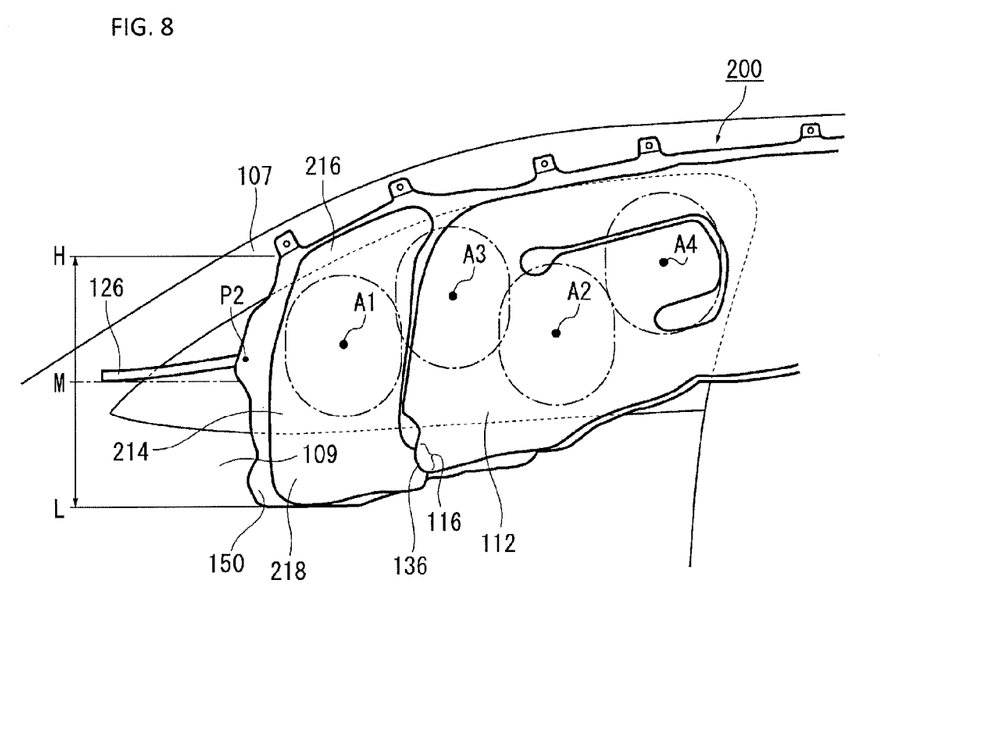
FIG. 8 is a diagram showing a modification of the curtain airbag of FIG. 1B.

FIG. 8 is a diagram illustrating a modification of the curtain airbag 100 of FIG. 1B. An airbag 200 of FIG. 8 is in an inflated and deployed state, and an arrangement position of a delay chamber 214 in this state is different from that of the delay chamber 114 of the airbag 100.

As illustrated in FIG. 8, the delay chamber 214 has an upper part 216 that is disposed so as to overlap the front pillar 107. Moreover, a lower part 218 of the delay chamber 214 overlaps the door trim 109 similarly to the airbag 100 (see FIG. 1B).

When the delay chamber 214 is subjected to an ejection preventing performance evaluation test, the delay chamber 214 is displaced toward the vehicle exterior side due to the impactor contacting thereon. In this case, the lower part 218 interferes with the door trim 109, and the upper part 216 interferes with the front pillar 107. Due to this, the displacement toward the vehicle exterior side is suppressed. In this case, since the delay chamber 214 maintains high internal pressure due to the wrinkled portion 132, the delay chamber can appropriately rebounce while preventing its attitude and inflated state from being destroyed by the front pillar or the like.

As described above, due to the synergistic effect of maintaining the internal pressure due to the wrinkled portion 132 and interfering with the front pillar 107, the delay chamber 214 can exhibit high ejection preventing performance. In particular, the delay chamber 214 is set so that an ejection of the impactor is within 100 mm toward the vehicle exterior side from the inner surface of the side window 108 so as to meet the specifications of the NHTSA-2009-0183. In line with this, the upper part 216 of the delay chamber 214 may be set so that the interference with the front pillar 107 is maintained in a state where the impactor is displaced by 100 mm from the inner surface of the side window 108. Due to this, it is possible to effectively improve the ejection preventing performance.

Moreover, in the present embodiment, the strap 126 has a length such that the strap 126 does not become tense upon completion of inflation and deployment of the airbag 100 so that the strap 126 does not prevent formation of the wrinkled portion 132. That is, the strap 126 is set to be long to some extent.

However, if the strap 126 is too long, the strap 126 may not perform its original function. Therefore, the length of the strap 126 is set such that the strap 126 does not become tense until the delay chamber 214 is displaced up to a predetermined position outside the vehicle, specifically until the impactor contacting the delay chamber 214 moves 100 mm toward the vehicle exterior side from the inner surface of the side window 108. Due to this, even when the airbag 100 oscillates upon receiving the occupant in an actual emergency situation, the wrinkled portion 132 may not disappear which may happen if the delay chamber 214 is pulled toward the strap 126. If the strap 126 has such a length, the strap 126 can exhibit its original function of preventing disorder in the deployment behavior of the airbag 100. In this manner, in the present embodiment, the strap 126 is set with such a consideration that the delay chamber 214 receives the occupant while maintaining high internal pressure due to the wrinkled portion 132.

Moreover, in the present embodiment, the strap 126 is provided at an attachment position P2 located above the gas channel portion 116 in the vertical direction of the airbag 100. If the strap 126 is formed at such an attachment position P2, since tension will not directly applied from the strap 126 to the gas channel portion 116, it is possible to prevent the tension from preventing formation of the wrinkled portion 136. In particular, in the present embodiment, the attachment position P2 of the strap 126 is located at a position on a vehicle-front-side edge 150 of the airbag 100 above the center (M) in the vertical direction (H to L). In this manner, in the present embodiment, it is possible to guarantee reliable formation of the wrinkled portion 136 and to obtain the effect of supporting the airbag 100 and stabilizing the deployment behavior of the airbag 100.

In order to maintain high internal pressure of the delay chamber 214, it is not necessary to completely block the gas channel portion 116 with the wrinkled portion 132, but it is only sufficient to at least allow the gas channel portion 116 to be narrowed by the wrinkled portion 132. Moreover, the strap 126 does not need to be long enough to prevent the strap 126 from becoming completely tense during completion of inflation, but if the strap 126 is long enough to form the wrinkled portion 132 that narrows at least the gas channel portion 116, the ejection preventing performance of the delay chamber 214 can be improved.

Due to the configuration described above, the delay chamber 214 can exhibit sufficient ejection preventing performance. Thus, for example, it is possible to reduce an area of the lower part 218 interfering with the door trim 109 and to decrease the material costs. In the respective embodiments, although the delay chamber 114 or 214 is disposed on the vehicle's front side of the airbag 100 or 200, the delay chamber 114 or 214 may be appropriately disposed at another positions such as at the rearmost chamber 140 illustrated in FIG. 2, for example.

Preferred embodiments of the present invention have been described above with reference to accompanying drawings, but the described embodiments are exemplary, and the invention may be embodied and implemented in other ways, in accordance with various methods. Unless specifically indicated in the description of the present application, the invention is not restricted by the shape, size, configurational arrangement and so forth of the detailed parts depicted in the drawings. Furthermore, the expressions and terms used in the description of the present application are explanatory in purpose, and are not meant to be limiting in any way, unless restricting subject matter to that effect is specifically set forth in the description.

Therefore, a person skilled in the art can devise various alterations or modifications within the scope as set forth in the claims, and it is to be understood that these alterations and modifications belong, as a matter of course, to the technical scope of the present invention.

In the embodiments, examples have been described wherein the curtain airbag according to the present invention is used in an automobile, but the present invention can be used, besides automobiles, also in aircraft and ships, to elicit similar effects.

The present invention can be used for curtain airbags that are inflated and deployed along a side surface of a vehicle interior for the purpose of protecting occupants during a side crash or a rollover (lateral rollover) of a vehicle.

What is claimed is:

1. A curtain airbag configured to be received above a side surface of a vehicle interior so as to be inflated and deployed along the side surface, comprising:
    a main chamber forming a bag-shaped inflation region configured to be inflated with gas flowing therein and to be inflated first;
    a delay chamber configured to be inflated with gas flowing from the main chamber;
    a linear seam portion in which front and back base fabrics of the curtain airbag are linearly joined so as to extend from an upper edge of the curtain airbag to a near side of a lower edge of the curtain airbag, the linear seam partitioning the main chamber from the delay chamber;
    a planar seam portion formed at a lower end of the linear seam portion and defining a non-inflation region in a predetermined range of the curtain airbag; and
    a gas inflow channel formed by the front and back base fabrics of the curtain airbag, the gas inflow channel being provided between the planar seam portion and the lower edge of the curtain airbag so as to allow gas to flow from the main chamber into the delay chamber, wherein the front and back base fabrics of the gas inflow channel sag upon completion of inflation and deployment of the curtain airbag and form a wrinkled portion that blocks or narrows the gas inflow channel.

2. The curtain airbag according to claim 1, wherein the wrinkled portion is formed in the gas inflow channel when the main chamber and the delay chamber are inflated, with the linear seam portion and the planar seam portion as a boundary, and caused to approach each other.

3. The curtain airbag according to claim 1, wherein the wrinkled portion is only formed between a lowermost side of the planar seam portion and the lower edge.

4. The curtain airbag according to claim 1, wherein the planar seam portion has a lower edge that forms an arc.

5. The curtain airbag according to claim 1, wherein in the wrinkled portion, the front and back base fabrics of the gas inflow channel are folded so that the front and back base fabrics are closely contacted with each other.

6. The curtain airbag according to claim 1, further comprising a strap configured to connect an end of the curtain airbag in a front-rear direction to a pillar of the vehicle, wherein the strap has such a length that the strap does not become tense upon completion of inflation and deployment of the curtain airbag.

7. A curtain airbag configured to be received above a side surface of a vehicle interior so as to be inflated and deployed along the side surface, comprising:
    a main chamber forming a bag-shaped inflation region configured to be inflated with gas flowing therein and to be inflated first;
    a delay chamber configured to be inflated with gas flowing from the main chamber;
    a linear seam portion in which front and back base fabrics of the curtain airbag are linearly bonded so as to extend from an upper edge of the curtain airbag to a near side of a lower edge of the curtain airbag, the linear seam partitioning the main chamber from the delay chamber;
    a planar seam portion formed at a lower end of the linear seam portion and defining a non-inflation region in a predetermined range of the curtain airbag; and
    a gas inflow channel formed by the front and back base fabrics of the curtain airbag, the gas inflow channel being provided between the planar seam portion and the lower edge of the curtain airbag so as to extend along the lower edge of the curtain airbag and to allow gas to flow from the main chamber into the delay chamber, wherein the front and back base fabrics forming the gas inflow channel are folded to form a wrinkled portion upon completion of inflation and deployment of the curtain airbag.

8. The curtain airbag according to claim 7, wherein in the wrinkled portion, the front and back base fabrics of the gas inflow channel folded so that the front and back base fabrics are closely contacted with each other.

9. The curtain airbag according to claim 7, further comprising a strap configured to connect an end of the curtain airbag in a front-rear direction to a pillar of the vehicle, wherein the strap has such a length that the strap does not become tense upon completion of inflation and deployment of the curtain airbag.

10. The curtain airbag according to claim 9, wherein the strap has such a length that the strap does not become tense until the curtain airbag receives an occupant to reach a predetermined position outside the vehicle.

11. The curtain airbag according to claim 9, wherein the strap is formed at a position above the gas inflow channel a vertical direction of the curtain airbag when provided in a vehicle.

12. The curtain airbag according to claim 9, wherein the strap is formed at a position above a center of the curtain airbag in a vertical direction of the curtain airbag when provided in a vehicle.

* * * * *

UNITED STATES PATENT AND TRADEMARK OFFICE
CERTIFICATE OF CORRECTION

PATENT NO. : 8,905,432 B2  
APPLICATION NO. : 14/003036  
DATED : December 9, 2014  
INVENTOR(S) : Atsushi Nakashima et al.

Page 1 of 1

It is certified that error appears in the above-identified patent and that said Letters Patent is hereby corrected as shown below:

In the Claims

Column 12, Claim 8, line 3: after "channel" insert --are--.

Signed and Sealed this  
Fourteenth Day of April, 2015

Michelle K. Lee  
*Director of the United States Patent and Trademark Office*